United States Patent
Lau et al.

(10) Patent No.: US 6,957,003 B2
(45) Date of Patent: Oct. 18, 2005

(54) CREATING LARGE BANDWIDTH LINE DEFECTS BY EMBEDDING DIELECTRIC WAVEGUIDES INTO PHOTONIC CRYSTAL SLABS

(75) Inventors: Wah Tung Lau, Stanford, CA (US); Shanhui Fan, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 174 days.

(21) Appl. No.: 10/291,089

(22) Filed: Nov. 8, 2002

(65) Prior Publication Data

US 2004/0001683 A1 Jan. 1, 2004

Related U.S. Application Data

(60) Provisional application No. 60/392,193, filed on Jun. 27, 2002.

(51) Int. Cl.[7] .................................................. G02B 6/20
(52) U.S. Cl. ........................ 385/129; 385/125; 385/123
(58) Field of Search ................................. 385/129, 125, 385/123

(56) References Cited

U.S. PATENT DOCUMENTS

| | | | |
|---|---|---|---|
| 5,526,449 A | | 6/1996 | Meade et al. |
| 6,728,439 B2 | * | 4/2004 | Weisberg et al. .............. 385/28 |
| 2002/0097963 A1 | * | 7/2002 | Ukechi et al. |
| 2002/0164137 A1 | * | 11/2002 | Johnson et al. |

OTHER PUBLICATIONS

*Two–dimensional photonic–bandgap structures operating at near–infrared wavelengths*, by T. F. Kraus, R. M. DelaRue, and S. Brand, Nature 383, 699 (1996).

*High Extraction Efficiency of Spontaneous Emission from Slabs of Photonic Crystals*, by S. Fan, P. R. Villeneuve, J. D. Joannopoulos, and E. F. Schubert, Phys. Rev. Lett. 78, 3294 (1997).

*Three–dimensional control of light in a two–dimensional photonic crystal slab*, by E. Chow et al, Nature 407, 983 (2000).

*Linear waveguides in photonic–crystal slabs*, by S. G. Johnson, P. R. Villeneuve, S. Fan and J. D. Joanopoulos, Phys. Rev. B 62, 8212 (2000).

*Demonstration of highly efficient waveguiding in a photonic crystal slab at the 1.5–mm wavelength*, by S.Y. Lin, E. Chow, S. G. Johnson and J. D. Joannopoulos, Opt. Lett. 25, 1297 (2000).

*Waveguides and waveguide bends in two–dimensional photonic crystal slabs*, by A. Chutinan and S. Noda, Phys. Rev. B 62, 4488 (2000).

*Methods for controlling positions of guided modes of photonic–crystal waveguides*, by M. Loncar, J. Vuckovic, and A. Scherer, J. Opt. Soc. Am. B 18, 1362 (2001).

(Continued)

Primary Examiner—Nikita Wells
Assistant Examiner—Zia R. Hashmi
(74) Attorney, Agent, or Firm—Parsons Hsue & de Runtz LLP (57) ABSTRACT

We introduce a general designing procedure that allows us, for any given photonic crystal slab, to create an appropriate line defect structure that possesses single-mode bands with large bandwidth and low dispersion within the photonic band gap region below the light line. This procedure involves designing a high index dielectric waveguide that is phase matched with the gap of the photonic crystal slab, and embedding the dielectric waveguide as a line defect into a crystal in a specific configuration that is free of edge states within the guiding bandwidth. As an example, we show a single mode line defect waveguide with a bandwidth approaching 13% of the center-band frequency, and with a linear dispersion relation throughout most of the bandwidth.

18 Claims, 4 Drawing Sheets

OTHER PUBLICATIONS

*Clear correspondence between theoretical and experimental light propagation characteristics in photonic crystal waveguides*, by T. Baba, N. Fukuya and A. Motegi, Electron. Lett. 37, 761 (2001).

*Extremely Large Group–Velocity Dispersion of Line–Defect Waveguides in Photonic Crystal Slabs*, M. Notomi, K. Yamada, A. Shinya, J. Takahashi, C. Takahashi, and I. Yokohama, Phys. Rev. Lett. 87, 253902 (2001).

*Large–bandwidth planar photonic crystal waveguides*, by T. Sondergaard and A. Lavrinenko, Opt. Commun. 203, 263 (2002).

*Light–propagation characteristics of Y–branch defect waveguides in AlGaAs–based air–bridge–type two–dimensional photonic crystal slabs*, Y. Sugimoto, N. Ikeda, N. Carlsson, K. Asakawa, N. Kawai, and K. Inoue, Opt. Lett. 27, 388 (2002).

*Demonstration of highly efficient waveguiding in a photonic crystal slab at the 1.5–mm wavelength*, by S.Y. Lin, E. Chow, S. G. Johnson and J. D. Joannopoulos, Opt. Lett. 25, 1297 (2000).

*Methods for controlling positions of guided modes of photonic–crystal waveguide*, by M. Loncar, J. Vuckovic, and A. Scherer, J. Opt. Soc. Am. B 18, 1362 (2001).

Johnson, S.G. et al., "Guided Modes in Photonic Crystal Slabs", Phys. Rev. B 60, pp. 5751–5758 (1999).

Adibi, A. et al., "Guiding Mechanisms in Dielectric–Core Photonic–Crystal Optical Waveguides", Phys. Rev. B 64, pp. 033308–2 –033308–4 (2001).

* cited by examiner

CREATING LARGE BANDWIDTH LINE DEFECTS BY EMBEDDING DIELECTRIC WAVEGUIDES INTO PHOTONIC CRYSTAL SLABS

CROSS REFERENCE TO RELATED APPLICATION

This application claims the benefit of U.S. Provisional application Ser. No. 60/392,193, filed on Jun. 27, 2002.

This work was supported in part by National Science Foundation under grant ECS-0200445. The government has rights in this application.

BACKGROUND OF THE INVENTION

This invention relates in general to waveguides in photonic-crystals and, in particular, to a structure where dielectric waveguides are incorporated in photonic crystal slabs.

Photonic crystal slab structures are constructed by introducing strong two-dimensionally periodic refractive index contrast into a high-index dielectric guiding slab. See, for example, *Two-dimensional photonic-bandgap structures operating at near-infrared wavelengths*, by T. F. Kraus, R. M. DelaRue, and S. Brand, Nature 383, 699 (1996). With sufficient refractive index contrast in the vertical direction, such structures support an in-plane photonic band gap that lies below the light line. For more information, please see *High Extraction Efficiency of Spontaneous Emission from Slabs of Photonic Crystals*, by S. Fan, P. R. Villeneuve, J. D. Joannopoulos, and E. F. Schubert, Phys. Rev. Lett. 78, 3294 (1997); and *Three-dimensional control of light in a two-dimensional photonic crystal slab*, by E. Chow et al, Nature 407, 983 (2000). This allows the structures to function as a fundamental substrate for large-scale integrated microphotonic circuit applications. For photonic integrated circuits, an essential building block is the waveguide structure. In order to function as an effective information carrying channel, the waveguide should possess several necessary properties: It should have its dispersion curve lying within the gap region below the light line to ensure low loss propagation within the guide and around sharp corners. The waveguide is preferably also single-moded, possesses sufficient bandwidth to accommodate the incoming signal, and displays minimal dispersion within the signal bandwidth. In a photonic crystal slab, a waveguide is typically created by introducing a line defect into the periodic lattices. These structures have been studied extensively with experiments and three-dimensional simulations. See, for example, any one of the following references:

1. *Linear waveguides in photonic-crystal slabs*, by S. G. Johnson, P. R. Villeneuve, S. Fan and J. D. Joanopoulos, Phys. Rev. B 62, 8212 (2000);

2. *Demonstration of highly efficient waveguiding in a photonic crystal slab at the 1.5-mm wavelength*, by S. Y. Lin, E. Chow, S. G. Johnson and J. D. Joannopoulos, Opt. Lett. 25, 1297 (2000);

3. *Waveguides and waveguide bends in two-dimensional photonic crystal slabs*, by A. Chutinan and S. Noda, Phys. Rev. B 62, 4488 (2000);

4. *Methods for controlling positions of guided modes of photonic-crystal waveguides*, by M. Loncar, J. Vuckovic, and A. Scherer, J. Opt. Soc. Am. B 18, 1362 (2001);

5. *Clear correspondence between theoretical and experimental light propagation characteristics in photonic crystal waveguides*, by T. Baba, N. Fukuya and A. Motegi, Electron. Lett. 37, 761 (2001);

6. *Extremely Large Group-Velocity Dispersion of Line-Defect Waveguides in Photonic Crystal Slabs*, M. Notomi, K. Yamada, A. Shinya, J. Takahashi, C. Takahashi, and I. Yokohama, Phys. Rev. Lett. 87, 253902 (2001); and 7. *Large-bandwidth planar photonic crystal waveguides*, by T. Sondergaard and A. Lavrinenko, Opt. Commun. 203, 263 (2002); and 8. *Light-propagation characteristics of Y-branch defect waveguides in AlGaAs-based air-bridge-type two-dimensional photonic crystal slabs*, Y. Sugimoto, N. Ikeda, N. Carlsson, K. Asakawa, N. Kawai, and K. Inoue, Opt. Lett. 27, 388 (2002).

However, many of the proposed waveguide structures exhibit relatively small guiding bandwidth and large group velocity dispersion. Developing ways to enlarge the waveguide bandwidth is therefore an important direction of research in photonic crystal structures. For examples of such effort, please see *Demonstration of highly efficient waveguiding in a photonic crystal slab at the 1.5-mm wavelength*, by S. Y. Lin, E. Chow, S. G. Johnson and J. D. Joannopoulos, Opt. Lett. 25, 1297 (2000); *Methods for controlling positions of guided modes of photonic-crystal waveguide*, by M. Loncar, J. Vuckovic, and A. Scherer, J. Opt. Soc. Am. B 18, 1362 (2001); and *Large-bandwidth planar photonic crystal waveguides*, by T. Sondergaard and A. Lavrinenko, Opt. Commun. 203, 263 (2002).

None of the above-described approaches are entirely satisfactory. It is therefore desirable to provide an improved waveguide structure, a method of making the structure, with characteristics that are improved over those described above.

SUMMARY OF THE INVENTION

This invention is based on the observation that a large bandwidth optical waveguide can be achieved by placing in the slit of a photonic-crystal slab a dielectric waveguide has a dispersion that is substantially phase matched with a band gap of the slab to form the optical waveguide. Dimensions of the slab, the slit and/or the dielectric waveguide are preferably adjusted such that there is substantially a single mode in a band gap of the photonic-crystal slab. Preferably these dimensions are also chosen to increase the bandwidth of the optical waveguide.

In one embodiment, a substantially single mode optical waveguide employs a photonic-crystal slab having a two-dimensional array of holes and a slit in the slab. A dielectric waveguide is also employed in the slit, where a dimension of the slab, the slit and/or the dielectric waveguide is such that there is substantially a single mode in a band gap of the photonic-crystal slab.

BRIEF DESCRIPTION OF THE FIGURES

For simplicity in description, identical components are labeled by the same numerals in this application.

DETAILED DESCRIPTION OF THE EMBODIMENT

In this application, we introduce a general designing procedure that allows us, for any given photonic crystal slab, to create an appropriate waveguide structure that possesses single-mode bands with large bandwidth and low dispersion within the photonic band gap below the light line. In the preferred embodiment, the procedure comprises two steps: we first design a conventional dielectric waveguide that is optimally phase matched with the band gap of the photonic crystal slab. We then embed the dielectric waveguide into the photonic crystal in an appropriate way such that the edge states are eliminated and single mode propagation is preferably ensured. This procedure produces waveguide structures with large bandwidth of single mode and lossless propagation, and create dispersion relations that are essentially linear over most of the guiding bandwidth.

Figure 1A:
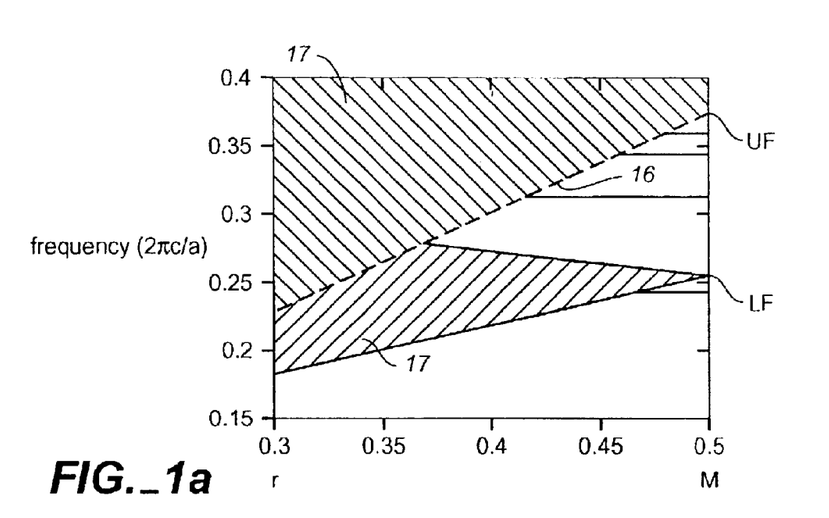
FIG. 1(a) is a band diagram of a photonic-crystal slab useful for illustrating the invention.

The underlying physical reasoning of our design is best illustrated by comparing the dispersion relation of a conventional dielectric waveguide with that of a typical photonic crystal waveguide. For concreteness, we consider the wave propagation along the ΓM direction in a photonic crystal with a triangular lattice of holes introduced into a dielectric structure 10 of FIG. 1(c), as shown in FIG. 1(a). (The M-point has a wavevector of 0.5(2π/a).)

Figure 1B:
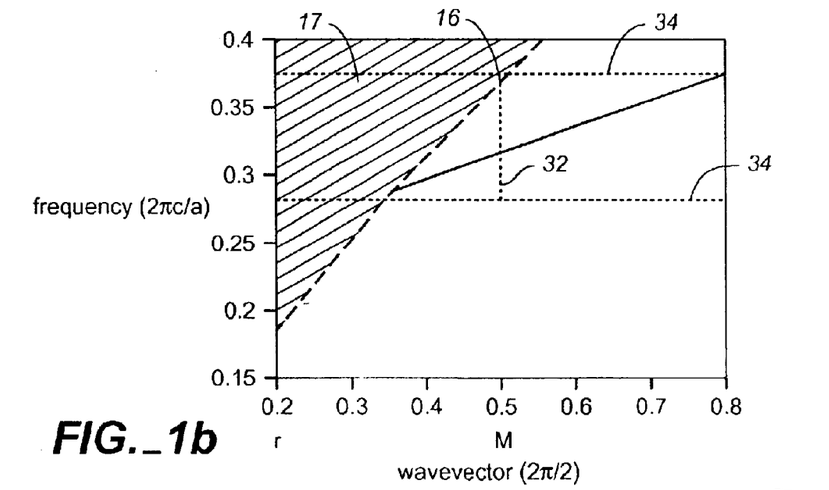
FIG. 1(b) is the band diagram of a dielectric waveguide useful for illustrating the invention.
Figure 1C:
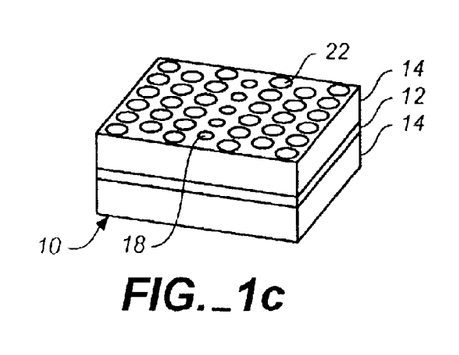
FIG. 1(c) is a perspective view of a photonic-crystal slab whose band characteristics are shown in FIG. 1(a).
Figure 1D:
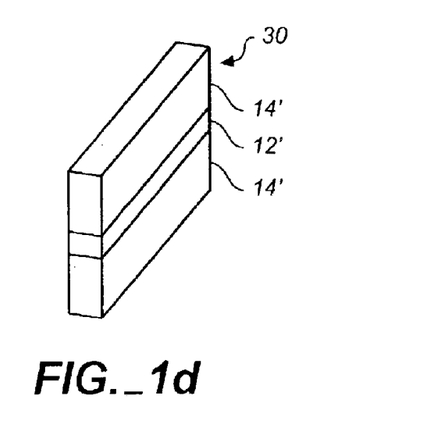
FIG. 1(d) is a perspective view of a conventional dielectric waveguide whose band characteristics are shown in FIG. 1(b), useful for illustrating the invention.

Each of the FIGS. 1(a), 1(b) is the band diagram for the corresponding dielectric structure 10 or 30 shown in FIGS. 1(c), 1(d). For the dielectric structures 10 and 30 shown in FIGS. 1(c) and 1(d), the regions 12 represents high refractive index materials, and the regions 14 represents low refractive index materials. For the band diagrams, the thick dashed lines 16 are the light lines. The shaded regions 17 represent the continuum of extended modes.

FIG. 1(a) is a band diagram of a line defect 18 in the photonic crystal slab 20 of FIG. 1(c). The crystal of FIG. 1(c) comprises a triangular array of air holes 22 with a radius of 0.35a introduced into the dielectric media, where a is the lattice constant of the crystal (region 12). The line defect 18 is created by reducing the radius of one row of holes from 0.35a to 0.20a. Holes 22 pass through all three layers: 14; 12, 14.

The dielectric structure 10 itself comprises a high-index dielectric layer 12, with a dielectric constant of 12, sandwiched between two low-index regions 14 with a dielectric constant 2.25. These choices of dielectric constants approximate that of Si or GaAs for the high index region, and $SiO_2$ or $Al_xO_y$ for the low index regions. The projected band diagram along the ΓM direction for such a crystal is shown as the shaded regions 17 in FIG. 1a. There is a large band gap for TE-like modes when the radius of holes (22) r=0.35a and the thickness of the layer (12) t=0.5a, where a is the lattice constant. See *Guided modes in photonic crystal slabs*, by S. G. Johnson, S. Fan, P. R. Villeneuve and J. D. Joannopoulos, Phys. Rev. B 60, 5751 (1999). The gap opens up around the M-point below the light line and occupies the frequency range (upper frequency UF and lower frequency LF) between 0.28–0.38 c/a, where c is the speed of light in layer 12.

Within the crystal, a waveguide is created by introducing a line defect. This can be achieved for example, by decreasing the radius of a single row of holes, as shown in FIG. 1c. See *Linear waveguides in photonic-crystal slabs*, S. G. Johnson, P. R. Villeneuve, S. Fan and J. D. Joanopoulos, Phys. Rev. B 62, 8212 (2000). Doing so places single-mode bands into the gap region (FIG. 1a). However, the large periodic index contrast in the vicinity of the line defect creates a strong distributed feedback [*Guiding mechanisms in dielectric-core photonic-crystal optical waveguides*, by A. Adibi, Y. Xu, R. K. Lee, M. Loncar and A. Scherer, Phys. Rev. B 64, 033308 (2001)], which leads to large dispersion and severely limits the bandwidth allowed. In contrast, for a conventional dielectric waveguide structure, such as waveguide 30 of FIG. (1d), there is no periodic index variation along the propagation direction (FIG. 1b). Hence, such conventional structures, while not enjoying the presence of in-plane photonic band gap confinement, nevertheless possess a much larger bandwidth in its single mode region.

FIG. 1(b) is a band diagram of a conventional dielectric waveguide, such as that of the structure 30 in FIG. 1(d) with corresponding high and low refractive index layers 12' and 14' respectively. The structure, surrounded by air, has a width of 0.6a. where a is the lattice constant. The vertical dotted line 32 represents the value of the wavevector for the M point. The two horizontal dotted lines 34 indicate the lower and upper frequencies of the gap (UF and LF) in the photonic crystal shown in FIG. 1(a) with the same thickness 0.5a for the high dielectric layer.

The motivation of our approach, therefore, is to try to combine the presence of an in-plane photonic band gap with the benefits of the larger bandwidth that is inherent in the conventional structures. We accomplish this by creating a line defect comprising a high index conventional dielectric waveguide. Since the gap for the photonic crystal slab is incomplete, the dispersion of the conventional guide is chosen to match the gap of the photonic crystal in terms of both the frequencies and the wave vectors. In other words, the gap and the dispersion of the dielectric waveguide are phase matched. For the ease of fabrication, we will fix the waveguide to have the same thickness as the crystal slab, only free parameter left then is the width w of the guide. And a choice of w=0.6a indeed creates a dispersion relation that is phase matched with the gap (as illustrated in FIG. 1b).

Figure 2:
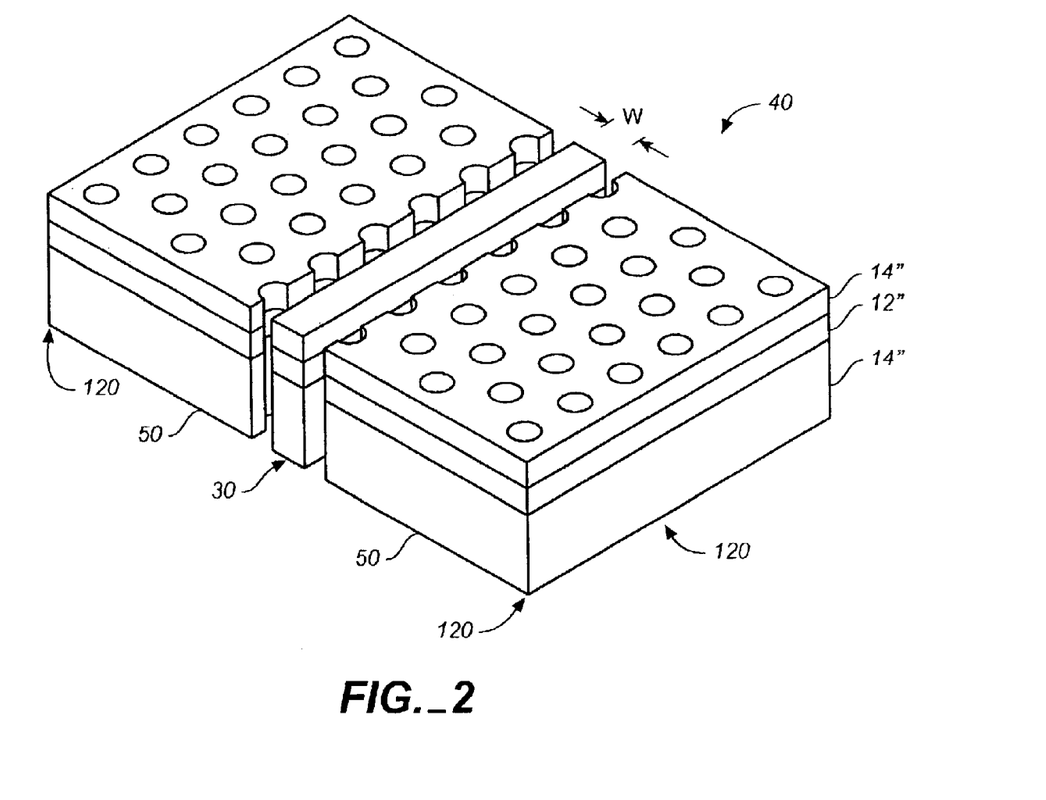
FIG. 2 is a perspective view of a photonic-crystal slab structure with a high refractive index dielectric waveguide located in a slit of the slab to form a line defect to illustrate one embodiment of the invention.

We now proceed to consider the dispersion relation of the crystal structure with a line defect comprising the dielectric waveguide designed above. The defect region is created by bisecting the crystal with an air trench or slit, and by placing the dielectric waveguide inside the trench as illustrated in FIG. 2 to form the optical waveguide 40. While not required for this invention, the basic periodicity of the crystal is preferably not disturbed in this procedure. In other words, the array of holes is periodic with the same period across the trench, as if a center section of the crystal is removed without disturbing the two remaining sections on the two sides of the removed section. Maintaining the basic crystal periodicity may be preferable for optical circuit design.

FIG. 2 is a perspective view of a line defect structure with a high index waveguide embedded in a bisected photonic crystal slab 50 with layers 14", 12" and 14". As will be explained below, one or both of the low index layers 14" may be omitted. The periodicity is important only in the high index layer 12".

Figure 3A:
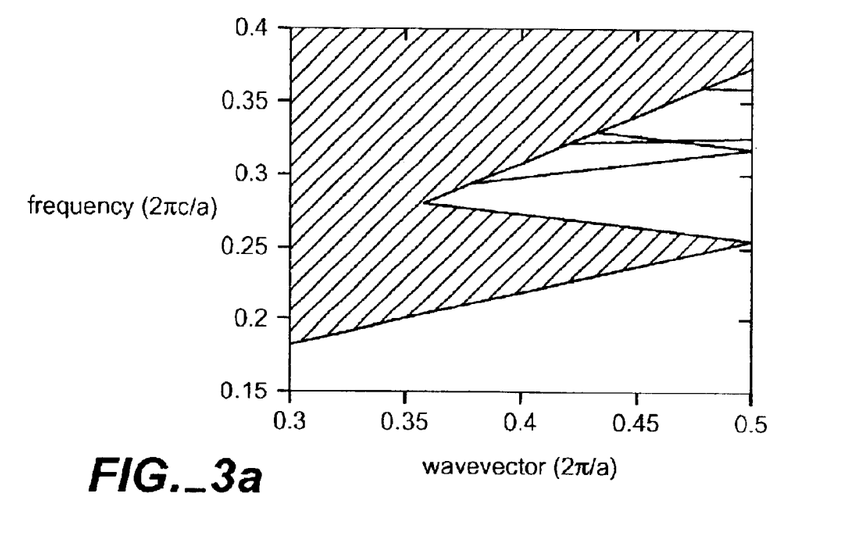
FIG. 3(a) is a band diagram illustrating a dispersion relation for a line defect structure comprising a conventional dielectric waveguide placed within the slit of a photonic-crystal slab, with the width of the air slit at 1.2a, a being the lattice constant. The line defect structure is shown in FIG. 3(d).
Figure 3B:
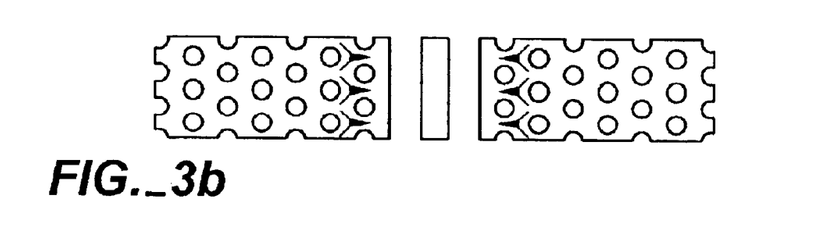
FIG. 3(b) is a cross-sectional view of the intensity in the electric field for the mode at the band edge of the line defect structure of FIG. 3(d).
Figure 3C:
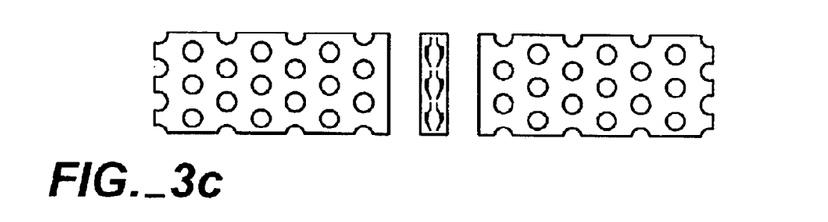
FIG. 3(c) is a cross-sectional view of the intensity in the electric field for the mode at the band edge in the dielectric waveguide of the line defect structure of FIG. 3(d).
Figure 3D:
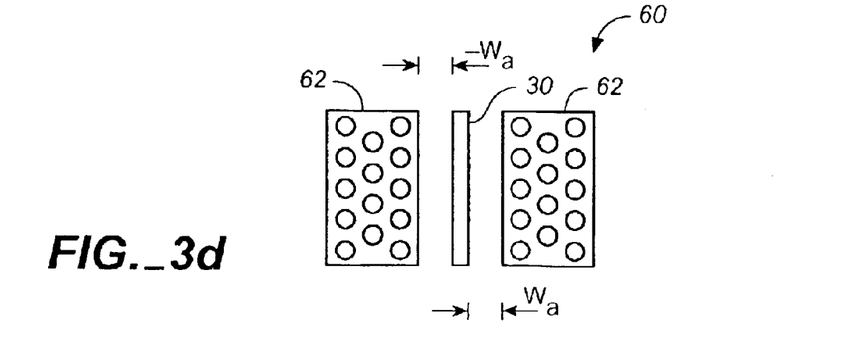
FIG. 3(d) is a top view of a line defect structure comprising a photonic-crystal slab defining an air slit where a conventional dielectric waveguide is placed within the slit, useful for illustrating the invention.

FIG. 3(a) is a graphical plot of the dispersion relation for a line defect structure, such as that of FIG. 3(d) with the width of the air slit at 1.2a. FIG. 3(d) shows the top view of the structure 60 with a bisected slab 62 and dielectric waveguide 30 as the line defect. FIG. 3(b) is a cross-sectional view of the intensity in the electric field for the mode at the band edge with a frequency of 0.327 ($2\pi c/a$). FIG. 3(c) is a cross-sectional view of the intensity in the electric field for the mode at the band edge with a frequency of 0.316 ($2\pi c/a$). In both FIGS. 3(b) and FIG. 3(c), the dark gray areas represent high electric field intensity, and white areas adjacent to the dark gray areas represent low electric field intensity.

In the above embodiment of FIG. 3(d), since the width w of the dielectric guide 30 is fixed already by phase-matching constraints, the only free parameter is the width of the air slit $w_a$ on both sides of the dielectric guide 30. The dispersion relation for a structure with $w_a$=1.2a (in which case the truncation is located in the dielectric region between the air holes) is shown in FIG. 3(a). In this case, in addition to the states that are associated with the dielectric waveguide, the presence of the interfaces between the air region and the periodic crystal introduce edge states into the gap. These edge states have most of the intensity localized at the interfaces between the air trench (slit) and the periodic region (FIG. 3b). In contrast, the states associated with the dielectric waveguide are largely localized within the high index region at the center of the structure (FIG. 3c).

Figure 4:
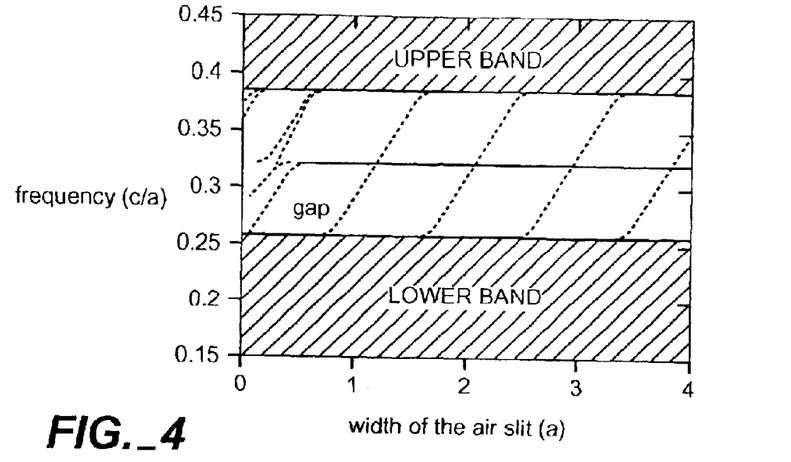
FIG. 4 is a graphical plot of the frequencies of modes at the M point as a function of width of the air slit in the line defect structure of FIG. 2.
Figure 5A:
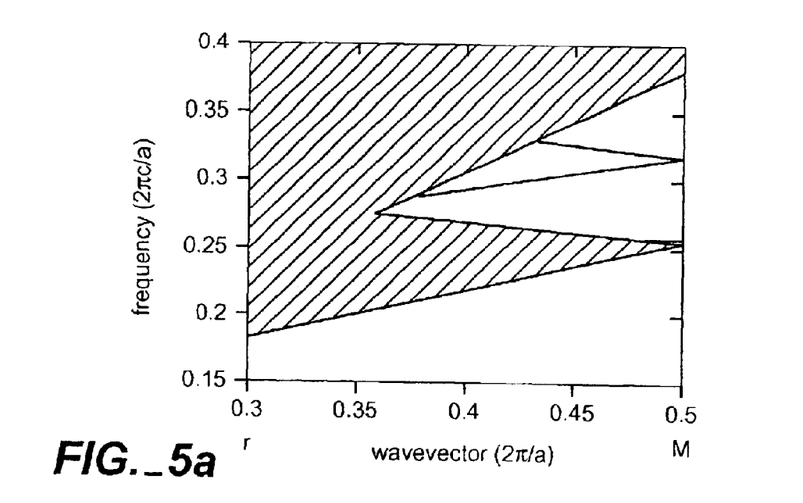
FIG. 5(a) is a band diagram illustrating the dispersion relation of an optimized line defect structure of the type shown in FIG. 5(b), with a width of the air slit at 0.8a, a being the lattice constant.
Figure 5B:
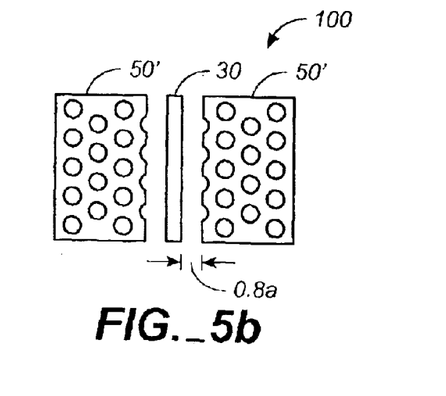
FIG. 5(b) is a top view of a line defect structure comprising a photonic-crystal slab with an air slit and a dielectric waveguide placed within the slit to illustrate an embodiment of the invention.

To design a single mode waveguide, it is thus desirable to remove the edge states from the wavelength range of the guided modes of the dielectric waveguide. Since the edge states are largely confined at the interfaces, they are sensitive to the dielectric configurations at the boundaries between the air trenches and the periodic region. Therefore the properties of these states can be systematically tuned by simply changing the width $w_a$ of the air slit. Moreover, the strong index contrast at the interfaces flattens the dispersion relation of the edge states (FIG. 3(a)). For design purposes we can therefore systematically study the effect of truncations at different values of $w_a$ by plotting the frequencies of confined modes at the M point as a function of $w_a$, as shown in FIG. 4. FIG. 4 illustrates frequencies of modes at the M-point as a function of width of the air slit for the line defect structure 40 shown in FIG. 2. The shaded region represents the frequency range of the extended states. The unshaded or white region is the band gap region. Except for the region of strong edge-waveguide interaction at $w_a$<0.5a, the frequency of the edge states varies periodically as a function of $w_a$. The period, 0.866a, corresponds exactly to the lattice constant of the crystal along the direction perpendicular to M. The two modes that are associated with the dielectric waveguide itself, on the other hand, are relatively insensitive to the interface conditions and have the frequencies remain approximately constant at the center of the gap when $w_a$ is sufficiently large. By choosing a truncation that corresponds to $w_a$=0.8a (resulting slab 50' illustrated in FIG. 5(b)), the edge states are completely removed from the guiding bandwidth. For such a structure 100, the dispersion relation indeed exhibits single (folded) guided mode with a large bandwidth extending from 0.29 to 0.33 c/a (FIG. 5(a)).

We note that, in the optimized structure the size of the air slit $w_a$=0.8a represents the distance between the edges of the dielectric guide and the periodic region of less than a quarter of the free space wavelength. Thus one expects that the electromagnetic field propagating within the guide should be strongly confined by the photonic band gap. On the other hand, the frequency splitting between the two modes at the M point is approximately 0.0001($2\pi c/a$). Hence the dispersion of the line defect within the gap largely resembles that of a stand-alone conventional dielectric waveguide with a large linear dispersion region. Therefore, in terms of dispersion properties, this design combines the best features of both photonic crystals and conventional dielectric waveguides. In addition, our design does not alter the basic underlying periodicity of the crystal, and does not require minimum feature sizes that are smaller than what is necessary to construct the crystal itself. These structural features are beneficial for design and fabrication purposes and will be significant for the future developments of integrated microphotonic circuits in photonic crystals.

In the above-described embodiment of the invention, the width of the dielectric waveguide is chosen so that its dispersion relation is substantially phase matched with the band gap of the photonic-crystal slab, and dimensions of the air slit are then chosen to reduce or eliminate edge modes or states, resulting in a substantially single mode in the band gap of the photonic-crystal slab. Where the dielectric waveguide comprises a layer of high dielectric constant material between two layers of low dielectric constant material, the thickness of the high dielectric constant material layer may be selected to increase the bandwidth of a dispersion curve for the optical waveguide in the band gap of the slab.

Thus, in the method described above, the crystal (primarily the high index layer) is designed by selecting its thickness and hole size so that it will have the desired band gap. Then it is bisected as shown in FIG. 3(d), leaving a spacing between two sections. The width of the dielectric waveguide placed in the spacing as shown in FIG. 3(d) is the selected to phase match the band gap. Then the distances (size of the slit) between the dielectric waveguide placed in the spacing and the two sections are selected to reduce edge modes to achieve a single mode device.

While the above-described method may be preferable for some applications, other methods for achieving substantially the same result may be used and are within the scope of the invention. Thus, instead of selecting the width of the dielectric waveguide to achieve phase matching, the thickness of the high dielectric constant layer of the dielectric waveguide placed in the spacing may be selected instead to achieve phase matching between the dispersion relation of the dielectric waveguide and the band gap of the slab. The width of the dielectric waveguide may then be selected to increase the bandwidth of a dispersion curve for the optical waveguide in the band gap of the slab.

Where the thickness of the dielectric waveguide is selected to achieve phase matching between the dispersion relation of the dielectric waveguide and the band gap of the slab, either the size of the slit or width of the dielectric waveguide may be selected so that the optical waveguide is substantially single mode. Instead of varying parameters associated with the dielectric waveguide in the spacing as described above, dimensions of the photonic-crystal slab may also be varied to achieve any one of the above-described effects: phase matching, increase of dispersion curve bandwidth and single mode. For example, either one or both of two variables associated with the slab may be varied: the radius of rods or holes in and the thickness of the photonic-crystal slab. Thus, either one or both of these parameters may be varied to achieve one or more of the above effects. Thus in general, dimensions of the slab structure, the slit, and/or the dielectric waveguide may be adjusted to achieve one or more of the above-described three effects. This can be done through computer simulation in a manner known to those skilled in the art, and the device can then be fabricated using the dimensions obtained through simulation.

Figure 6:
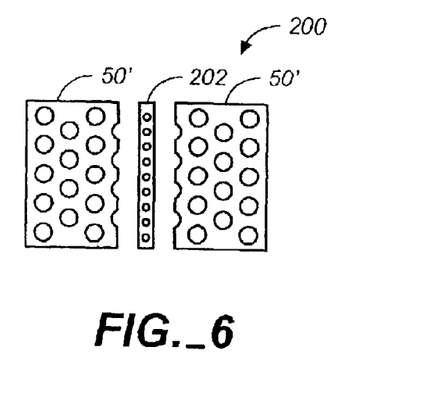
FIG. 6 is a top view of a line defect structure comprising a photonic-crystal slab with an air slit and a dielectric waveguide with an array of holes therein and placed within the slit to illustrate another embodiment of the invention.

Once the edge states from the truncation of the crystal are removed, instead of putting into the slit a dielectric wave guide structure with a uniform dielectric profile along the propagation direction as described above, one could place other dielectric structures with other dispersion characteristics into the slit as well. One example would be to introduce an array of air holes within the dielectric wave guide to further engineer the dispersion relation of the line defects. FIG. 6 is a top view of a line defect structure comprising a bisected and truncated photonic-crystal slab 50' with an air slit and a dielectric waveguide 202 with an array of holes therein and placed within the slit to illustrate another embodiment of the invention.

Furthermore, we found that the above results can be obtained if the low index layers 14" in FIG. 2 are omitted altogether and replaced by air, or where one of the low index layers is replaced by air and the other by a silicon oxide layer with or without holes therein. Where both low index layers are omitted, the high index layer may be held in place by supports at the edges of the layer 12" at locations indicated at arrows 120 in FIG. 2. Such and other variations are within the scope of the invention.

While the invention has been described above by reference to various embodiments, it will be understood that changes and modifications may be made without departing from the scope of the invention, which is to be defined only by the appended claims and their equivalent. For example, for easier fabrication, the high index layer in the slab and the high index layer in the dielectric waveguide have substantially the same thickness; however, this is not required, and these may be different for some applications. All references referred to herein are incorporated by reference in their entireties.

What is claimed is:

1. A method for making an optical waveguide, comprising:
   providing a photonic-crystal slab having a slit therein; and
   placing in the slit a dielectric waveguide having a dispersion that is substantially phase matched with a band gap of the slab to form the optical waveguide, wherein dimensions of the slab structure, the slit, and/or the dielectric waveguide are adjusted such that there is substantially a single mode in a band gap of the photonic-crystal slab.

2. The method of claim 1, further comprising selecting dimensions of the dielectric waveguide so that the dispersion relation of the dielectric waveguide is substantially phase matched with the band gap of the slab.

3. The method of claim 2, wherein said selecting selects width of the dielectric waveguide so that the dispersion relation of the dielectric waveguide is substantially phase matched with the band gap of the slab.

4. The method of claim 3, said dielectric waveguide comprising a first layer of high dielectric constant material between two layers of low dielectric constant material, and wherein said selecting selects thickness of the first layer in the dielectric waveguide to increase bandwidth of a dispersion curve for the optical waveguide in the band gap of the slab.

5. The method of claim 2, said dielectric waveguide comprising a first layer of high dielectric constant material between two layers of low dielectric constant material, and wherein said selecting selects thickness of the first layer in the dielectric waveguide so that the dispersion relation of the dielectric waveguide is substantially phase matched with the band gap of the slab.

6. The method of claim 5, wherein said selecting selects width of the dielectric waveguide to increase bandwidth of a dispersion curve for the optical waveguide in the band gap of the slab.

7. The method of claim 2, said dielectric waveguide comprising a first layer of high dielectric constant material between two layers of low dielectric constant material, and wherein said selecting selects thickness of the first layer in the dielectric waveguide or width of the dielectric waveguide so that the optical waveguide is single mode.

8. The method of claim 1, further comprising selecting a distance between the dielectric waveguide and the slab to reduce edge states in or near the band gap.

9. The method of claim 8, wherein said selecting comprises varying the distance and determining presence of edge states in or near the band gap.

10. The method of claim 9, wherein said selecting selects a value for the size of the slit where substantially no edge states are present in or near the band gap.

11. The method of claim 1, wherein said providing comprises truncating a photonic-crystal slab having a two dimensional array of holes to form the slit.

12. The method of claim 1, said dielectric waveguide comprising a first layer of high dielectric constant material between two layers of low dielectric constant material, said method further comprising providing the dielectric waveguide so that the high dielectric constant material in the waveguide comprises Si or GaAs, and said low dielectric constant material in the waveguide comprises $SiO_2$, $Al_xO_y$, or air.

13. An optical waveguide, comprising:
   a photonic-crystal slab having a two dimensional array of holes and a slit therein; and
   a dielectric waveguide that is substantially phase matched with the slab to form the optical waveguide in the slit, wherein a dimension of the slit, slab and/or waveguide is such that there is substantially a single mode in a band gap of the photonic-crystal slab.

14. The waveguide of claim 13, said dielectric waveguide comprising a first layer of high dielectric constant material between two layers of low dielectric constant material, said high dielectric constant material comprising Si or GaAs, and said low dielectric constant material in the waveguide comprising SiO2, AlxOy, or air.

15. The waveguide of claim 13, said photomc-crystal slab comprising a photonic-crystal with a triangular or rectangular lattice of holes.

16. The waveguide of claim 13, said slab comprising two portions separated from each other by the slit, each of the two portions having some of the holes in the two dimensional array, and wherein said two dimensional array of holes of the two portions are periodic across the slit.

17. The waveguide of claim 16, wherein said two portions are formed by truncating a photonic-crystal slab having a two dimensional array of holes to form the slit.

18. The waveguide of claim 13, said dielectric waveguide defining therein an array of holes.

* * * * *

UNITED STATES PATENT AND TRADEMARK OFFICE
CERTIFICATE OF CORRECTION

| | | |
|---|---|---|
| PATENT NO. | : 6,957,003 B2 | Page 1 of 1 |
| APPLICATION NO. | : 10/291089 | |
| DATED | : October 18, 2005 | |
| INVENTOR(S) | : Lau et al. | |

It is certified that error appears in the above-identified patent and that said Letters Patent is hereby corrected as shown below:

• Please replace Column 1, line no. 10-12 with:

-- FEDERALLY-SPONSORED RESEARCH OR DEVELOPMENT
This invention was made with Government support under contract 0200445 awarded by the National Science Foundation. The Government has certain rights in this invention. --

Signed and Sealed this

Eleventh Day of December, 2012

David J. Kappos
*Director of the United States Patent and Trademark Office*